Patented Oct. 26, 1937

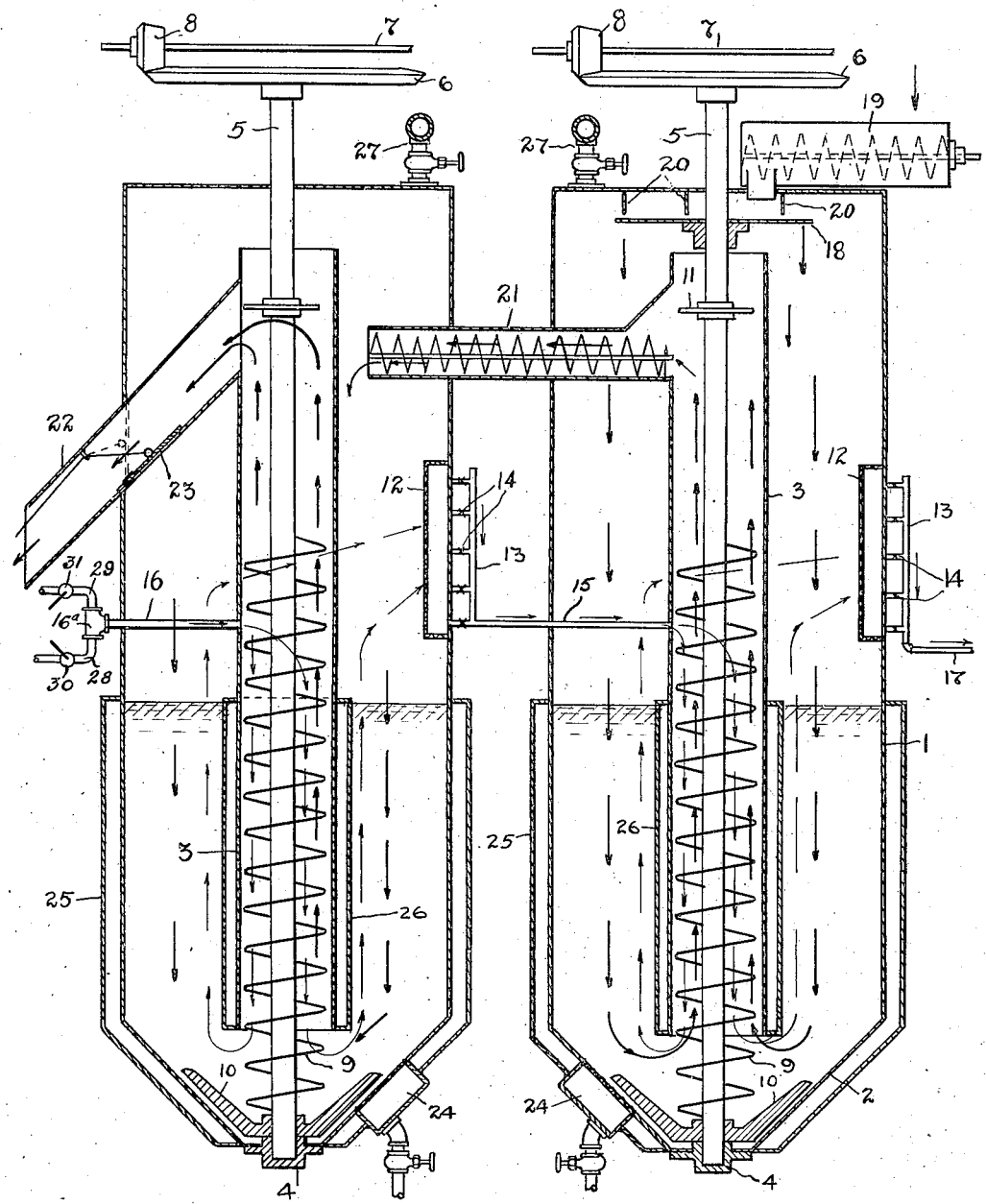

2,096,728

UNITED STATES PATENT OFFICE 2,096,728

APPARATUS FOR EXTRACTING OILS FROM OLEAGINOUS MATERIALS

Henry H. Bighouse, Cleveland Heights, Ohio, assignor to The C. O. Bartlett & Snow Company, Cleveland, Ohio, a corporation of Ohio Application August 14, 1934, Serial No. 739,811

14 Claims. (Cl. 87—6)

This invention relates, as indicated, to an apparatus for extracting and more particularly, to the extraction of oleaginous material from solids such as crushed seeds and beans by means of a solvent.

It is a principal object of my invention to provide a means for extracting, as above defined, wherein the solid material to be treated and from which the oil and the like is to be extracted is caused to move in true counterflow relation to the extracting solvent so that all of the desirable material sought to be extracted from the solids may be efficiently and completely removed therefrom.

It is a further and more particular object of my invention to provide an apparatus of the character described characterized by compactness and simplicity of construction, advantageous not only from the standpoint of low cost of manufacture, but increased efficiency of operation as well.

It is a further and more specific object of my invention to provide an apparatus of the character described wherein the solid material to be treated is caused to move through concentrically arranged ascending and descending paths, which are truly vertical so that a more efficient action by the solvent upon the solid material is insured.

It is a further object of my invention to provide an apparatus wherein the extracting process may be effectively carried out in different stages and with a minimum of handling of the material being treated.

It is a further object of my invention to provide a novel mode of extracting wherein a single piece of apparatus may be used for the dual purpose of extracting the oleaginous material from the solids and for separating such extracted oleaginous material from the solvent.

Other objects of my invention will appear as the description proceeds.

To the accomplishment of the foregoing and related ends, said invention, then, consists of the means hereinafter fully described and particularly pointed out in the claims; the annexed drawing and the following description setting forth in detail certain means and one mode illustrating, however, but one of the various ways in which the principle of the invention may be used.

The single figure in the annexed drawing is a transverse sectional view of an apparatus constructed in accordance with the principles of my invention.

Referring now more specifically to the drawing, it will be noted that for purposes of convenience, I have illustrated two substantially identical units arranged side by side and so connected that the solid material to be treated may be introduced to the first of such units and discharged from the second and the solvent used as the extracting medium is introduced to said second unit and discharged from the said first unit. Inasmuch as the two units are substantially identical in construction, similar reference characters will be employed to designate like parts.

Each unit comprises an outer vertically disposed substantially cylindrical casing 1 having a closed bottom generally indicated at 2, which bottom is coniform for the purpose hereinafter more fully explained. Mounted centrally within the outer casings 1 are tubular open-ended shells 3 which extend to a point adjacent the bottom 2. Mounted within the casings 1, extending through the inner shells 3 and journalled in step bearings 4 are rotatable shafts 5, to the upper end of which there may be secured bevel gears such as 6, whereby the same may be driven from shafts such as 7 through bevel pinions 8. Secured to and rotatable with the shafts 5 are helical conveyors 9. Likewise secured to the lower portions of the shafts 5 are impellors 10 for the purpose hereinafter more fully explained. The shafts 5, in their upper regions, also carry spiked projections 11 for the purpose of breaking up the solid treated material which is conveyed upwardly through the shells 3 by means of the conveyors 9.

The casings 1 are, at their inner peripheries, each provided with housings 12, the walls of which are formed of some suitable foraminous material so that the solvent may be drawn off from within the casings 1 at a plurality of levels through the branched conduits 13 which, at 14, are provided with valves by which the solvent level in the casings may be controlled. Leading through the outer casings and into the space defined by the inner shells 3 are solvent supply conduits 15 and 16 respectively; the former in the drawing shown connected to the solvent outlet conduit 12 of the lefthand unit and the latter adapted to be connected to some suitable source of fresh solvent supply. At this point, it should be noted that the solvent outfall pipe 17 will preferably lead to a suitable distillation plant, not shown, wherein the solvent will be volatilized out of the solution so that the extracted oleaginous material may be recovered and the solvent re-used.

One of the shafts 5 may have a feed table plate 18 secured thereto upon which the solid material to be treated is deposited by means of a suitable screw conveyor, such as 19. Mounted above the feed table 18 are a plurality of plows 20 so arranged as to be effective when the table 18 is rotated by means of the shaft 5 to move the solid material outwardly over the edge of the plate, so that it may drop downwardly into the solvent bath as indicated by the heavy arrows.

The treated solid material after being conveyed upwardly through the inner shells 5 may be discharged laterally therefrom either by means of a screw conveyor such as 21 or an inclined chute such as is generally illustrated at 22. The screw conveyor 21 is preferably used where a lateral discharge in the horizontal plane of the treated material is desired, such as may be necessary when two units are arranged contiguously as illustrated in the drawing so that the two units need not be arranged at different levels. The inclined chute 22 may be provided with a trap-door 23 which, when moved into the dotted line position, prevents the material from being discharged outwardly as indicated by the heavy arrows but instead diverts such material back into the solvent bath within the casing 1.

The casings 1 may be provided with drain gates generally indicated at 24 for the purpose of draining out all of the solvent, the solution or the extracted oleaginous material in the manner and for the purpose hereinafter more fully explained.

In order that the material within the treating apparatus may be heated, which may be necessary in order to extract certain types of material, or in order to accelerate the extraction process generally, I provide steam jackets 25 and 26 respectively associated with the casing 1 and the inner shell 3. In order to carry off volatilized solvent for the purpose hereinafter more fully explained, the casings 1 may be provided with vents 27 which will lead to suitable condensation apparatus, not shown.

The operation of the above described apparatus is briefly as follows:—Let it first be assumed that only one of the units is employed in which case, there will be no second unit present such as is illustrated on the lefthand in the drawing.

The solid material which is to be subjected to the extracting process is introduced, as indicated by the arrow, to the screw conveyor 19 which deposits the same onto the feed table 18. The plows 20 will move such solid material off from the edge of the feed table permitting the same to fall, as indicated by the heavy arrows downwardly into the solvent bath contained within the casing 1. The solvent bath will be maintained at any selected level such as is determined by a particular one of the valves 14 in the branched outlet conduit 13. The line above the shaded area in the casing 1 denotes the approximate level of the solid material within the casing. A solvent for the oleaginous material to be extracted from the solids is introduced by means of the pipe 15 to the space defined by the inner shell 3. Rotation of the shaft 5 will cause the impellor 10 to maintain the solid material in the bottom of the casing in a sufficiently agitated state so that it may be picked up by the conveyor 9 and moved upwardly through the casing 3 in a truly vertical direction and in counterflow relation to the direction of flow of the solvent. The solvent passing downwardly through the ascending column of solid material in the casing 3 is discharged laterally from the lower end of such casing to pass upwardly through the descending solvents and to be ultimately discharged through the branched outfall conduit 13.

As the cake of solid material passes upwardly in the inner shell 3 above the opening to the solvent inlet pipe 15, such cake is drained of solvent and ultimately broken up by the element 11 to be then laterally discharged by means of the conveyor 21.

The fact that the directions of flow of both the solid and the solvent in both ascending and descending paths is truly vertical is an important advantage for the following reason:—If a solvent having a specific gravity lower than that of the solids were employed and the path of the material was inclined to the vertical, the solids would settle to the bottom and the solvent would float on top; thus there would not be as complete an interspersion of the solvent through the solids as is the case when the path of movement of the materials is truly vertical. Similarly, if a solvent having a specific gravity greater than the specific gravity of the solids were employed, the solvent would settle to the bottom and the solids would float on top of the stream of solvent.

When it is necessary to subject the solid materials to a second pass through the solvent in order to effectively remove all or substantially all of the oleaginous material therefrom, two units may be arranged side by side in the manner illustrated in the drawing. When such arrangement is employed, the partially treated solids discharged from the first unit through the conveyor 21 passes downwardly through the solvent bath in the second casing to be picked up at the bottom of such casing by the second conveyor 9 and then carried upwardly to be ultimately discharged laterally of the second unit by means of the chute 22.

It is recognized that certain installations of apparatus constructed in accordance with the principles of my invention will not be required to treat as large a quantity of solid materials as is possible by the process just outlined, wherein the solid materials are substantially directly passed through the treating unit and a continuous supply of solvent withdrawn to be separated from the extracted oleaginous material in a separate distillation plant.

When only relatively small amounts of solid material are to be treated, such operation may proceed as a batch process in the following manner:—In this case only one unit such as that illustrated on the lefthand in the drawing need be used. A charge of solid material is introduced into the casing as well as a charge of solvent. The trap-door 23 is then moved into the dotted line position and the shaft 5 rotated in such a direction as to convey the solid material upwardly within the inner shell 3. Underneath the trap door in its full line position as illustrated in the drawing there is an opening which when such trap door is raised to the dotted line position permits the treated material which has been discharged from the upper end of the inner shell 3 to drop into the space between the shell and the outer casing. Thus continued rotation of the conveyor 9 results in a recirculation of the solid material in the casing 1 and through the shell 3. Continued rotation of the shaft 5 will result in a repeated circulation of the solid material through the cycle which comprises downward movement within the space between the casing 1 and the inner shell 3 and upward movement in the space defined by the inner shell 3. The ascending column or cake of solids within the casing 3 will have a tendency to carry upwardly therewith certain quantities of the solvent. The process of recirculating, as just described, will be continued until the solvent will have had an opportunity to extract all or substantially all of the oleaginous material from the solids, whereupon the delivery of fresh solvent through the pipe connection 16 is stopped and the solvent and oleaginous material below the draw-off level 13 is removed through the outlet 24, and, thereupon, by means of the steam in the jackets 25 and 26, and the circulation of the solid material by the operation of the conveyor 9, the solvent in the solid material is volatilized and drawn off through a vent, generally indicated at 27. When this solid material has become solvent-free, it is discharged through the spout 22, and the operations just described repeated. In order to completely volatilize all of the solvent from the solid material being treated, it may be necessary to heat the same by the introduction to the chamber of live steam. This may be accomplished by providing a header 16a to which the solvent supply conduit 16a is connected. To the header 16a there are also connected solvent supply conduits 28 and a steam pipe 29 which are respectively provided with valves 30 and 31. After the solvent and oleaginous material has been drawn off, as above described, the solvent supply valve 30 is closed and the steam valve 31 opened to admit live steam to the casing. After this steam treatment has been completed, the steam valve 31 will, of course, be closed before the next operation, i. e., before the solvent valve 30 is opened.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:—

1. In a treating apparatus of the character described, the combination of a vertically disposed casing, an inner shell arranged centrally within said casing and extending adjacent the bottom thereof, a conveyor within said shell, means associated with the upper portion of said shell for discharging solid treated material laterally of said casing, means for introducing solvent to the upper portion of the space within said shell and means for drawing off the solvent from the upper portion of the space between said shell and casing.

2. In a treating apparatus of the character described, the combination of a vertically disposed cylindrical casing having a closed bottom, a tubular shell arranged centrally within said casing and extending to a point adjacent the bottom thereof, a screw conveyor within said shell, means associated with the upper portion of said shell for discharging solid treated material laterally of said casing, means for introducing solvent to the upper portion of the space within said shell and means for drawing off the solvent from the upper portion of the space between said shell and casing.

3. In a treating apparatus of the character described, the combination of a vertically disposed cylindrical casing having a closed bottom, an inner tubular shell having an open bottom arranged centrally within said casing and extending adjacent the bottom thereof, a screw conveyor within said shell, a conveyor extending from the upper portion of said shell laterally of said casing, means for introducing solvent to the upper portion of the space within said shell and means for drawing off the solvent from the upper portion of the space between said shell and casing.

4. In a treating apparatus of the character described, the combination of a vertically disposed cylindrical casing having a closed bottom, a steam jacket around the lower portion of said casing, a shell arranged centrally within said casing and extending to a point adjacent the bottom thereof, a conveyor within said shell, means associated with the upper portion of said shell for discharging solid material laterally of said casing, means for introducing solvent to the upper portion of the space within said shell and means for drawing off the solvent from the upper portion of the space between said shell and casing.

5. In a treating apparatus of the character described, the combination of a vertically disposed cylindrical casing having a closed bottom, a tubular shell arranged centrally within said casing and extending adjacent the bottom thereof, means for conveying the solid material being treated upwardly through said shell, means associated with the upper portion of said shell for selectively discharging said solid material therefrom to the space between said shell and said casing or laterally of said casing, means for introducing solvent to the upper portion of the space within said shell and means for drawing off the solvent from the upper portion of the space between said shell and casing.

6. In a treating apparatus of the character described, the combination of a vertically disposed cylindrical casing having a closed bottom, a steam jacket associated with the lower portion of said casing, a tubular shell having an open bottom arranged centrally within said casing and extending adjacent the bottom thereof, a screw conveyor within said shell, a material discharge chute extending laterally from the upper portion of said shell whereby the solid material moved upwardly within said shell by said conveyor may be selectively discharged to the space between said shell and casing and laterally of said casing, means for introducing solvent to the upper portion of the space within said shell and means for drawing off the solvent from the upper portion of the space between said shell and casing.

7. In a treating apparatus of the character described, the combination of a vertically disposed substantially cylindrical casing having a closed bottom, a substantially tubular shell arranged centrally within said casing and extending to a point adjacent the bottom thereof, means for feeding solid material to be treated to the upper portion of the space between said casing and shell, means for conveying such solid material upwardly within said shell, means for selectively discharging the treated solid material from the upper portion of said shell to the space between said shell and casing or laterally of said casing, means for introducing solvent to the upper portion of the space within said shell and means for drawing off the solvent from the upper portion of the space between said shell and casing.

8. In a treating apparatus of the character described, the combination of a vertically disposed substantially cylindrical casing having a closed bottom, a substantially tubular shell arranged centrally within said casing and extending to a point adjacent the bottom thereof, means for feeding solid material to be treated to the upper portion of the space between said casing and shell, means for conveying such solid material upwardly within said shell, means for discharging the treated solid material laterally from the upper portion of said shell, means for introducing solvent to the upper portion of the space within said shell, and means for withdrawing such solvent from the upper portion of the space between said shell and casing.

9. In a treating apparatus of the character described, the combination of a vertically disposed cylindrical casing having a closed bottom, a tubular shell arranged centrally within said casing and extending adjacent the bottom thereof, a rotatable shaft extending vertically through said shell, conveyor blades carried by said shaft, a plate secured to said shaft above said shell, means for depositing solid material to be treated on said plate, means adjacent said plate and adapted upon rotation thereof to discharge the solid material therefrom into the space between the upper portion of said shell and casing, means for introducing solvent to the upper portion of the space within said shell and means for drawing off the solvent from the upper portion of the space between said shell and casing.

10. In a treating apparatus of the character described, the combination of a vertically disposed cylindrical casing having a closed bottom, a tubular shell arranged centrally within said casing and extending adjacent the bottom thereof, a rotatable shaft extending vertically through said shell, conveyor blades secured to said shaft, a plate secured to said shaft above said shell, means for depositing solid material to be treated on said plate, means adjacent said plate and adapted upon rotation thereof to discharge the solid material therefrom into the space defined between the upper portion of said shell and casing, means for introducing solvent to the upper portion of the space within said shell, and means for withdrawing such solvent from the upper portion of the space between said shell and casing.

11. In a treating apparatus of the character described, the combination of a vertically disposed cylindrical casing having a closed bottom, a tubular shell arranged centrally within said casing and extending adjacent the bottom thereof, a rotatable shaft extending vertically through said shell, conveyor means secured to said shaft, an impellor carried by said shaft and overlying the bottom of said casing, means associated with the upper end of said shell for discharging laterally therefrom the solid treated material moved upwardly therein by said conveyor, means for introducing solvent to the upper portion of the space within said shell and means for drawing off the solvent from the upper portion of the space between said shell and casing.

12. In a treating apparatus of the character described, the combination of a vertically disposed cylindrical casing having a closed bottom, a tubular shell arranged centrally within said casing and extending adjacent the bottom thereof, a rotatable shaft extending vertically through said shell, a conveyor carried by said shaft, an impellor carried by said shaft and overlying the bottom of said casing, means associated with the upper end of said shell for discharging laterally therefrom the solid treated material moved upwardly therein by said conveyor, a plate secured to said shaft above said shell, means for depositing material to be treated on said plate, means adapted upon rotation of said plate to discharge the solid material therefrom to the space between the upper end of said shell and casing, means for introducing solvent to the upper portion of the space within said shell and means for drawing off the solvent from the upper portion of the space between said shell and casing.

13. In a treating apparatus of the character described, the combination of a vertically disposed cylindrical casing having a closed bottom, a tubular shell arranged centrally within said casing and extending adjacent the bottom thereof, a rotatable shaft extending vertically through said shell, a conveyor carried by said shaft, an impellor carried by said shaft and overlying the bottom of said casing, means associated with the upper end of said shell for discharging laterally therefrom the solid treated material moved upwardly therein by said conveyor, a plate secured to said shaft above said shell, means for depositing material to be treated on said plate, means adapted upon rotation of said plate to discharge the solid material therefrom to the space between the upper end of said shell and casing, means for introducing solvent to the upper portion of the space within said shell, and means for withdrawing such solvent from the upper portion of the space between said shell and casing.

14. Apparatus for continuous lixiviation of solid material, comprising a receptacle divided into two concentric chambers, means for causing the solvent to flow through the two chambers in succession, and means for moving the material to be lixiviated through said chambers in succession in the opposite direction to the flow of the solvent in each chamber.

HENRY H. BIGHOUSE.